United States Patent [19]

Wally, Jr.

[11] 3,734,615

[45] May 22, 1973

[54] VACUUM FILM PLATEN AND CONDENSER LENS ASSEMBLY FOR PHOTO REPRODUCTION APPARATUS

[75] Inventor: Joseph H. Wally, Jr., Kansas City, Mo.

[73] Assignee: Western Blue Print Co., Kansas City, Mo.

[22] Filed: May 27, 1971

[21] Appl. No.: 147,497

[52] U.S. Cl. .........................355/76, 353/96, 355/73
[51] Int. Cl. .............................................G03b 27/64
[58] Field of Search ..................355/73, 76; 353/24, 353/96

[56] References Cited

UNITED STATES PATENTS

| | | | |
|---|---|---|---|
| 3,433,564 | 3/1969 | Lahr | 355/76 |
| 3,115,808 | 12/1963 | Durst | 355/73 |
| 3,064,524 | 11/1962 | Durst | 355/73 |
| 3,259,046 | 7/1966 | Nishimura | 355/73 X |
| 3,455,634 | 7/1969 | Guffon | 355/73 X |
| 3,588,079 | 6/1971 | Addy | 355/76 |

Primary Examiner—Samuel S. Matthews
Assistant Examiner—E. M. Bero
Attorney—Johnson, Dienner, Emrich, Verbeck & Wagner

[57] ABSTRACT

The condenser lens system of a camera-projector has a rectangular channel in the first surface thereof which is connected to an air evacuating pump and adapts said surface as a film platen, and a plate embedded in said surface along one side of the channel has means for orienting a film on said surface. The plate has an inner wall along its length positioned so as to form a space with the part of the channel in which it is positioned for the passage of air.

13 Claims, 10 Drawing Figures

PATENTED MAY 22 1973  3,734,615

INVENTOR
JOSEPH H. WALLY Jr.

BY Johnson, Diemer, Emrich, VerBeck & Wagner
ATTORNEYS

INVENTOR
JOSEPH H. WALLY Jr.

BY *Johnson, Dienner, Emrich,*
*Verbeck & Wagner*

ATTORNEYS

INVENTOR
JOSEPH H. WALLY Jr.
BY Johnson, Dienner, Emrich,
Verbeck & Wagner
ATTORNEYS

VACUUM FILM PLATEN AND CONDENSER LENS ASSEMBLY FOR PHOTO REPRODUCTION APPARATUS

This invention relates to photographic apparatus such as projectors and camera-projectors which are used in photocopying graphic sheet material. More particularly the invention comprises novel and improved means by which film and negatives processed therefrom are supported in said apparatus.

In my copending application, Ser. No. 836,317, filed June 25, 1969 there is shown and described photographic apparatus such as a camera-projector with which this invention is particularly useful. The there disclosed apparatus comprises an optical head which is movably supported from overhead tracks for spatial adjustment relative to a subject holder on which is supported graphic sheet material to be copied. The optical head embodies a film platen and an objective which is axially adjustable relative to the film platen for sharpening focus of the film image on the subject holder, or the converse, at the different spatial settings of the optical head. The film platen is transparent and it is illuminated by light which is collimated through a condenser lens system behind the film platen. In the camera mode of the apparatus the light source is dark, allowing an image of material on the subject holder to be photographically reproduced on film supported on the platen. In the projector mode of the apparatus a negative processed from the film is positioned on the film platen and light rays from the light source illuminate the negative so that an image thereof may be projected by the objective onto sensitive paper supported on the subject holder to complete the copying process. It is a feature of such apparatus that in both the camera and the projector modes of the apparatus the same optics are employed and both the film and negative processed therefrom can be located in the same reference plane and at the same spatial settings with respect to the objective and the subject holder.

In application Ser. No. 836,317 the film platen comprises a thin transparent member having parallel ground opposed surfaces. This member is adhesively secured or fused to centrally of the light exiting or first surface of the condenser lens system. The supporting structure for the condenser lens includes a frame which overlies the margin of the first condenser surface about the film platen member and is spaced therefrom to leave a narrow channel thereabout which is ported to an air evacuation pump so that a film or negative positioned over said platen and surrounding channel can be drawn into tight conformity with the exposed surface of the platen.

In a later filed copending application, Ser. No. 40,881, I disclose a structure wherein the frame of the condenser lens support itself supports the transparent platen member centrally over said first or light exiting surface of the condenser lens. In this instance the frame is recessed about the edge of the platen member to provide a narrow channel which also is ported to the air evacuating pump.

In accordance with my present invention, and it is a principal object thereof that, means are provided in such apparatus by which film and/or negatives processed therefrom may be supported directly on the first or light exiting surface of the condenser lens system.

A further and more specific object of the invention is that such apparatus be provided with means which facilitate the precise location and orientation of the film and negatives on the most optically correct and therefore most useful area of the first surface of the condenser lens system.

In accordance with the invention the central area of the light exiting surface of the condenser lens system constitutes a reference plane in which the films and negatives are supported. For this purpose the central image area of the lens surface is polished to within a few mils of flatness and appropriately spaced pairs of slots or grooves are milled in said light exiting surface which intersect and define a continuous channel about the central or image area of said light exiting surface. The portions of said intersecting grooves which extend outside the channel are filled to flush with the lens surface and the channel is ported through the condenser lens supporting structure to an air evacuating pump. Film or negatives placed over the central image area of the condenser lens surface so as to lap said continuous channel can be drawn into tight conformity with said central area of the condenser lens surface to assume the plane character thereof. Embedded in said lens surface along the outside of one of said grooves is a plate or member having orienting means which accurately locate the film or negative each time on the platen surface in the same coaxial aligned relation with respect to the objective and condenser lenses.

The inclination of the reference plane in which the image area of the film and negatives are placed thus becomes a function of the central region of the light exiting surface of the condenser lens to which the film and negatives closely conform. This means that the problems inherent in grinding and polishing the opposed surfaces of the thin and much smaller sized plates which comprise the platen are not longer of concern. No longer exists the problem of what tolerances can be accepted when grinding the opposed surfaces of the transparent platen member to parallelism nor what plate thickness can be effectively handled in the polishing machines and still permit locating the film or negative supporting surface sufficiently close to the light exiting surface of the condenser lens system to assure its acceptable lighting. Neither are there the problems of accurately aligning the platen surface with respect to the condenser lens and at the proper angle to the optical axis of the objective.

The massive dimensions of the condenser lens, including its thickness, make it relatively easy to mount in the usual polishing machine and when properly mounted therein the condenser lens is inherently stable. Moreover, since the area of concern comprises but a fraction of the total surface area of the planar side of the condenser lens, it presents much less of a grinding and polishing problem. The surface area of the condenser lens which also constitutes its light exiting area can be ground to a degree of flatness previously unobtainable as a practical matter for the film supporting surface. For example, it is possible to grind and polish said surface more easily to a flatness characterized by a near minimum fringe count of the order of say less than five.

Moreover the ability to place the negative directly on the light exiting surface of the front condenser which is thus ground truly flat assures a near perfect lighting of the full image area of the film and negatives out to their very edge.

Since the inclination of the film and negative is now a function of the condenser lens surface and the degree of flatness to which it is ground, this means that the film and negative can be precisely located and such that no portion of its image area varies more than an insignificant amount from a true plane. Thus it is a feature of the invention that copies produced of the original can be kept essentially free of distortion throughout the full area of the image.

A feature of the invention, therefore, is that the film and/or negatives can be oriented in a plane which is accurate and is precisely located with respect to the optics comprised in the apparatus whether the same is operated in its camera or in its projector mode.

A further and important feature of the invention is that the negative can be so supported that it is uniformly lighted throughout its full image area in the projection mode of the apparatus.

A further feature of the invention is that it includes a novel arrangement for porting the evacuating channel in the lens surface which utilizes the condenser lens supporting frame in an efficient and effective manner and simplifies the assembly operation. At the same time, the structure is also economical and practical to manufacture.

Many other objects, advantages and features of the invention will be at once apparent or will become so from a consideration of the detailed description of a preferred embodiment of the invention which now will be described in connection with the accompanying drawings to which reference may be had.

Referring to said drawings.

Figure 1:
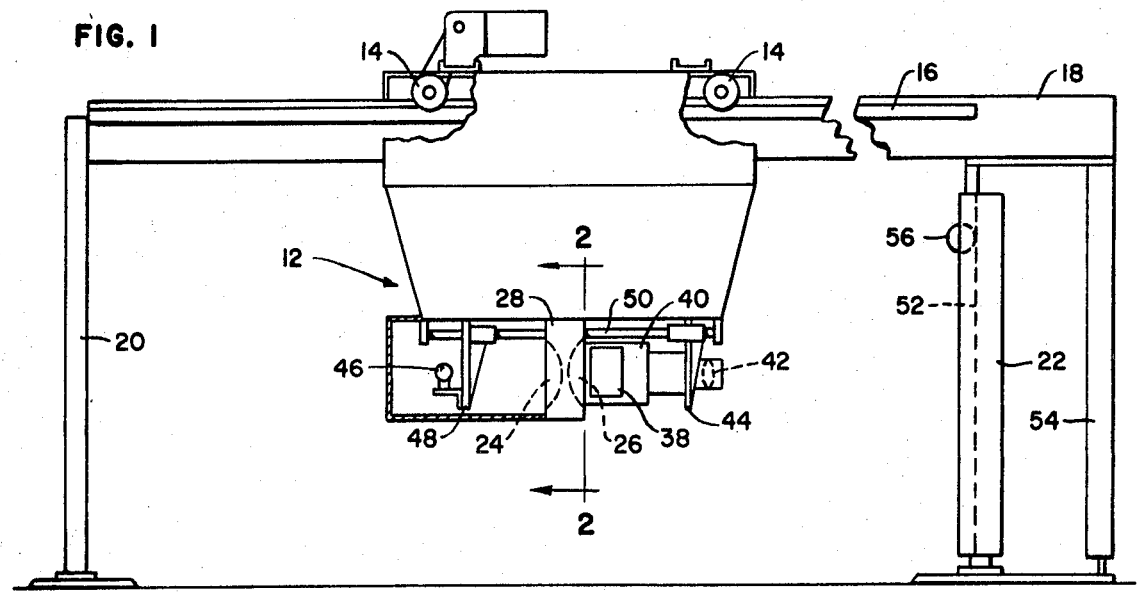
FIG. 1 is a side elevational view of a photographic apparatus with which the invention is utilized.

Referring now more particularly to the several views wherein like parts are identified by like reference numerals, FIG. 1 illustrates a camera-projector with which the present invention is useful. Said apparatus is more completely disclosed and claimed in the above mentioned copending application for U.S. Patent, Ser. No. 836,317 to which reference may be had for an understanding of its construction and operation. However, for purposes of understanding the present invention, it will suffice to point out that the apparatus illustrated by FIG. 1 comprises an optical head indicated generally at 12. Said optical head is suspended from front and rear pairs of wheels 14 which move along a pair of tracks 16 mounted on both sides of an overhead rigid supporting structure 18 shown supported at its rear end by a columnar structure 20 and at its forward end by structure comprising a subject holder 22 relative to which the optical head moves. The optical head comprises a pair of plano-convex lenses 24, 26 arranged with their convex surfaces facing inwardly toward each other, as is conventional. Said condenser lenses are enclosed within a dust-tight box-like enclosure or supporting structure 28 having an axially aligned light aperture in the front and rear walls thereof. As will afterwards be explained more in detail, the forward wall of structure 28 comprises a jig plate 30 (FIG. 2) having a rectangular shaped light aperture 32 aligned with the central portion of the light exiting surface 34 of the condenser lens 26 which is designated as the film platen surface 36 and in accordance with this invention serves to support the film in the camera mode of the apparatus and the negative processed from said film in its projector mode. Access to said film platen surface 36 for positioning a film or a negative thereon or removing it therefrom is obtained through door 38 in plenum 40. At 42 is an objective supported by lens board 44 and at 46 is a point source of light supported by light board 48. Lens board 44 and light board 48 are mounted on massive-sized and rigid, precisely related tubular ways 50 which accommodate axial adjustment of the spatial relation of the objective 42 and point source of light 46 relative to the film platen surface portion 36 on the light exiting surface 34 of the front condenser lens 26.

Subject holder 22, as more particularly described in my mentioned copending application, comprises a vertically disposed translucent member 52 having a planar subject receiving surface which faces the optical head 12 and is surrounded by a peripherally located continuous channel connected to an air evacuating pump, not shown. At 54 is a structure on which fluorescent bulbs or other illuminating means are supported for optionally back-lighting the translucent member 52. At 56 is a roll of pliofilm or other suitable flexible transparent plastic sheet material which is secured at the top of the subject holder 22 and is dimensioned to overlie the mentioned area evacuating channel about the periphery of the translucent member 52 when unrolled. Sheet material comprising copy work or sensitive paper on which an image is to be projection-printed is located within the area of the translucent member 52 defined by the air evacuating channel and the pliofilm roll 56 is unrolled thereacross so as to be drawn tightly against the surface of the translucent member 52 with evacuation of air from the mentioned panel. The unrolled pliofilm sheet thus tightly holds the sheet material against the flat vertical surface of the translucent member 52 during the photographing or projection printing operation.

Optical head 12 as thus described may be utilized as a camera with its point source of light 46 deenergized or it may be used as a projector when the light source is illuminated. The light head is moved as a unit forward and away from the subject holder to locate the front surface 34 of the condenser lens, and more particularly its centrally disposed film supporting platen surface 36, at the proper spatial setting or distance from the surface of the subject holder 22 to introduce a desired image reduction factor when the apparatus is used as a camera or to introduce a magnification factor when it is used as in projection printing. The objective 42 is also independently adjustable on ways 50 toward and away from the central platen surface 36 of the front condenser lens 26 by moving lens board 44 and this adjustment serves to sharpen the focus of the projected image.

Figure 2:
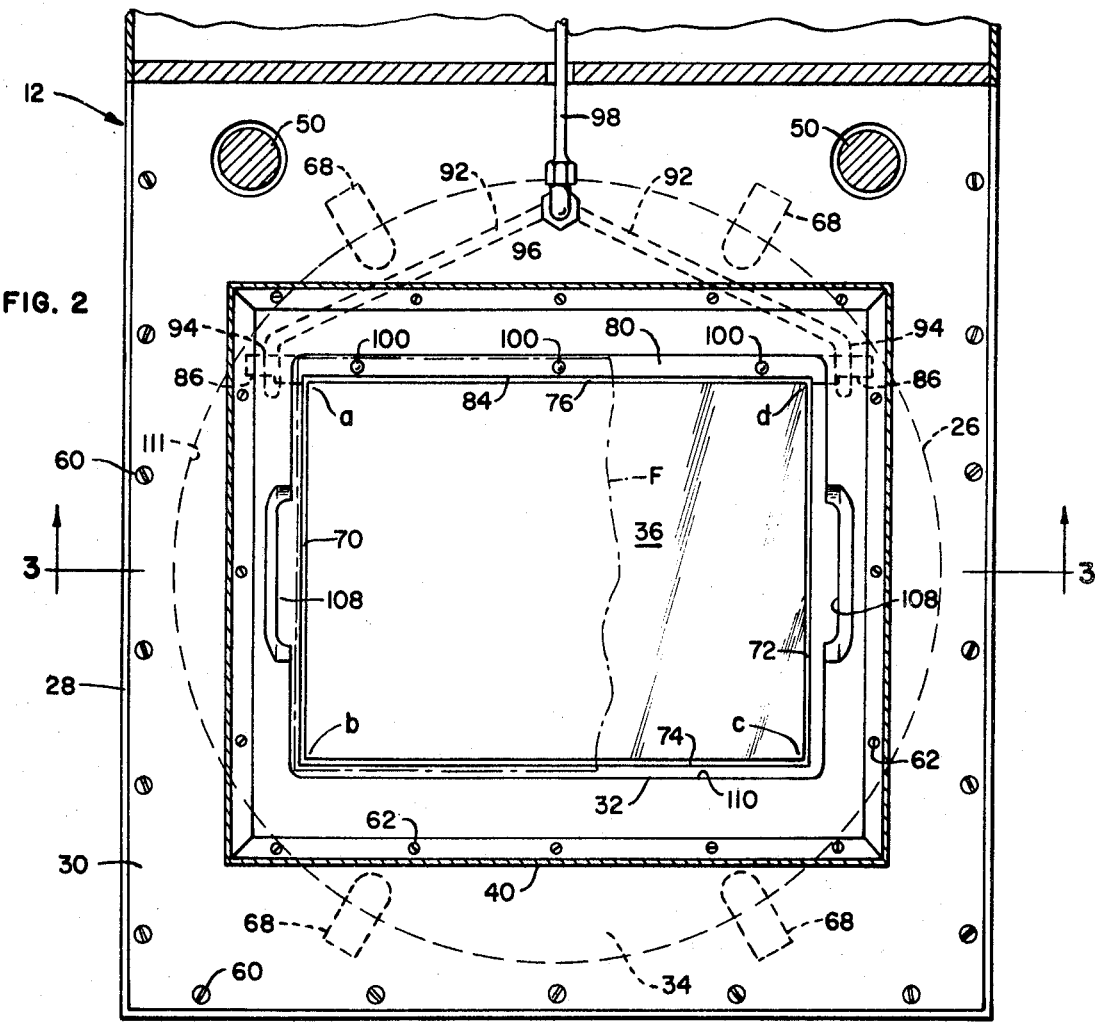
FIG. 2 is a view taken along lines 2—2 in FIG. 1 looking in the direction indicated by the arrows and illustrates the portion of the light exiting surface of the first condenser lens and the associated supporting structure which is utilized in mounting a film or negative.
Figure 3:
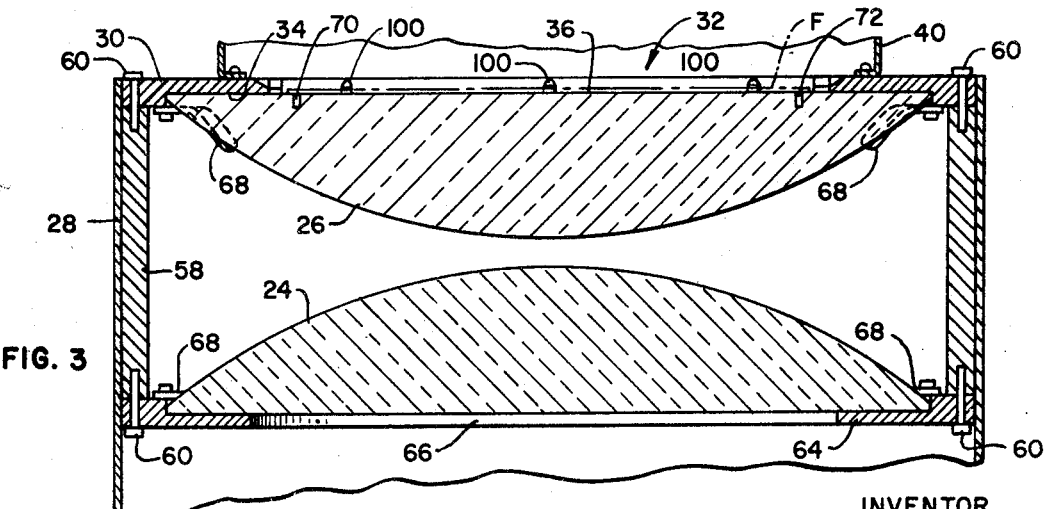
FIG. 3 is a sectional view taken along lines 3—3 in FIG. 2 looking in the direction indicated by the arrows and illustrates details in the manner of mounting and assembling the condenser lenses with their supporting structure.

Considering now FIG. 3 with FIG. 2, the condenser lens housing 28 includes the aforementioned front jig plate 30 to which the sidewalls 58 of the condenser lens housing are secured as by screws 60. Jig plate 30 also serves as means to which the film plenum or housing 40 is secured as by screws 62. The rear or inner side of jig plate 30 constitutes an abutment against which the outer marginal surface 34 of the front condenser lens 26 engages and it includes the aforementioned central opening or light aperture 32 which is of generally rectangular shape and has rounded corners as illustrated in FIG. 2. At 64 is a rear jig plate which similarly overlies the margin of the flat plano side surface of the rear condenser lens 24 and it also has a generally rectangular central opening 66 therethrough which is aligned with and corresponds in size and location to opening 32 in the front jig plate 30. Condenser lens 24 and 26 are removably secured to the respective rear and front jig plate 64 and 30 as by clips 68. Rubber or other suitable cushioning material may be located between the clips 68 and the convex surface of the condenser lens which they engage.

Figure 4:
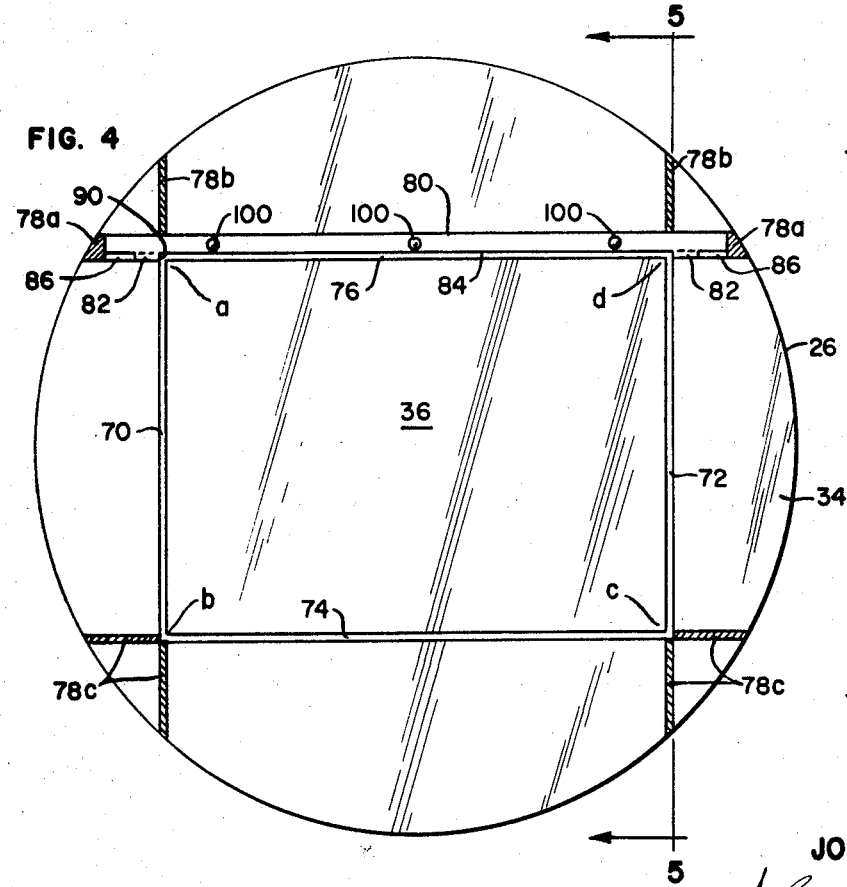
FIG. 4 is a plan view of the light exiting surface of the front condenser lens and illustrates the lens disassembled from its supporting structure.
Figure 5:
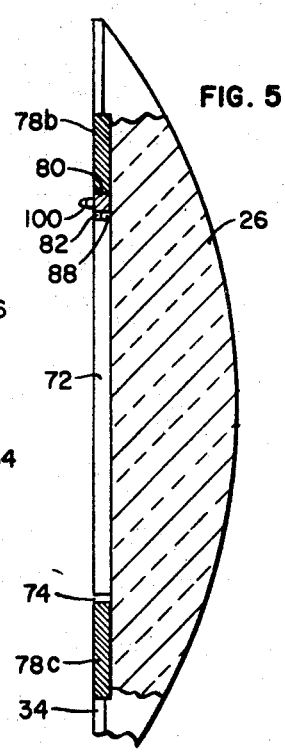
FIG. 5 is a sectional view taken through the lens along lines 5—5 of FIG. 4.

Referring now to FIGS. 4 and 5, the central portion of the first or light exiting surface 34 of the front condenser lens 26 is adapted for supporting films and negatives thereon by milling two intersecting pairs of spaced parallel slots or grooves therein having inner, outer and bottom walls, the pairs of grooves being disposed at right angles and so as to enclose a generally rectangular shaped portion of said surface 34 which is hereinafter referred to as the film platen surface 36. One pair of said grooves are indicated at 70 and 72 in FIG. 4 and are considered as vertically disposed. The second pair of grooves are indicated at 74 and 76 and are considered as horizontally disposed. Both said pairs of grooves are illustrated as milled out to the edge of the lens. However, this is for manufacturing convenience, and if desired, said grooves may be milled to a point beyond their intersections but short of the outer edge of the lens. Where the grooves extend out to the lens edge, the end portions of the grooves are plugged by filling them to flush with the lens surface 34 with a suitable optical cement which bonds effectively to the glass material of the condenser lens. All four grooves are milled to substantially the same depth and grooves 70, 72 and 74 have substantially the same width. Groove 76, however, has a width several times the width of the other three grooves and it receives a registration pin bearing plate 80 which is adhesively secured therein. Plate 80 has a flat outer surface 80a and a thickness or depth corresponding to the depth of slot grooves 76 such that when adhesively secured therein, its outer surface 80a is essentially flush with lens surface 34. One of the two long edges of plate 80 is linear and uninterrupted. Its other edge, however, includes a pair of projections 82 spaced inwardly of the ends of plate 80. These projections divide said edge into an intermediately disposed elongated cut out or recess 84 therebetween and a pair of relatively short cutouts 86 at the outer ends of the plate. Beneath said projections 82, as illustrated by FIG. 5, is an opening or port 88 through which communication is established between cutouts 84 and 86. Plugs 78a of the aforementioned optical cement fill the remaining portions of groove 76 out to the lens edge. Plugs 78b fill the portions of horizontal grooves 70 and 72 which extend beyond plate 80 and plugs 78c fill these portions of grooves 70, 72 and 74 which extend beyond the intersections thereof. As illustrated by FIG. 4 and also seen in FIG. 6, projections 82 are so located that their inner or facing edges 90 align with the outer edges of the respective vertical grooves 70 and 72. Therefore, as shown by FIG. 4, cutout 84 with the portions of grooves 70, 72 and 74 disposed between intersections $a, b, c, d$ comprise a continuous rectangular-shaped channel about the film platen surface 36. As illustrated in FIG. 2, said grooves 70, 72, 74 and cutout 84, which comprise said channel, are generally aligned parallel with the adjacent sides of aperture 32 in the jig plate 30 and are spaced inwardly thereof. Projections 82 are so dimensioned that cutouts 86 are completely covered by jig plate 30 and no portion of said cutouts 86 lie within the confines of opening 32.

Figure 6:
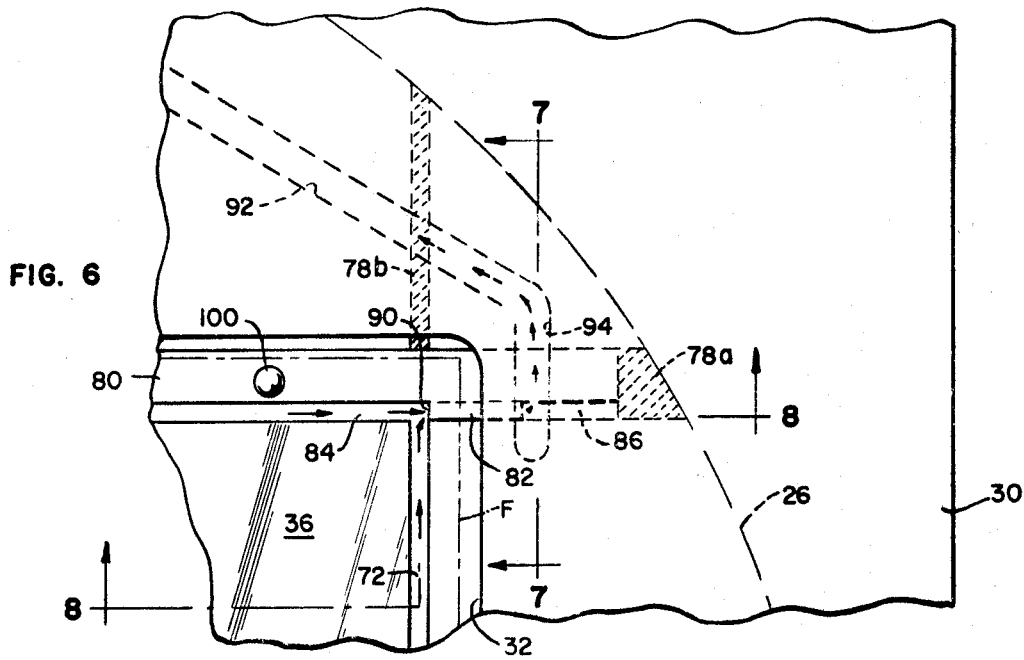
FIG. 6 is a fragmented view taken on an enlarged scale of the upper right hand corner of the assembly illustrated in FIG. 2 and shows details of the means employed to port the air evacuating channel in the first condenser lens surface to the evacuation pump.
Figure 7:
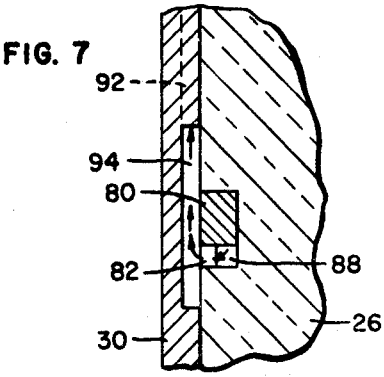
FIG. 7 is a sectional view taken along lines 7—7 of FIG. 6.
Figure 8:
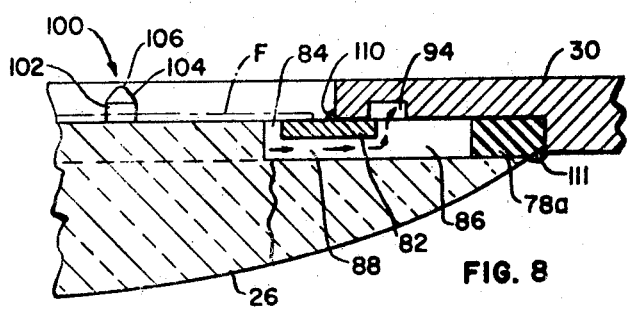
FIG. 8 is a sectional view taken along lines 8—8 in FIG. 6.

Considering now FIGS. 6, 7 and 8 with FIG. 2, the inner side of jig plate 30 is flat so that when the front condenser lenses are properly assembled therewith it intimately engages said first lens surface 34. As shown by dash lines in FIG. 6, the inner side of jig plate 30 has a pair of angular related channels 92 milled or otherwise formed therein. Said channels have parallel end portions 94 which align with and overlie cutouts 86 in plate 80 when said first condenser lens is properly assembled with its first surface 34 against the jig plate. The opposite ends of said channel 92 communicate with a fixture at opening 96 which connects via conduit 98 to an air evacuating pump (not shown).

Referring again to FIG. 2, plate 80 serves as a mount for three equally spaced registration pins 100 which are secured as by a press fit or in provided openings in said plate 80. Pins 100 each have a cylindrical shaped film orientation or aligning portion 102, a conical shaped entrant portion 104 and a spherical shaped outer end 106. Registration pins 100 serve to receive prepunched film and/or negatives F and orient the same on platen surface 36. Said film or negatives F have a length and width in excess of the corresponding dimensions of platen surface 36 such that when oriented on said surface 36 the margins of said films or negatives lap the continuous channel comprising the cutout 84 and communicating grooves 70, 72 and 74. As illustrated by FIGS. 2, 6 and 8, the air evacuation pump connects via channels 92 and their end portions 94 to cutouts 86, through opening 90 beneath projections 82 and into cutout 84 and the portions of slots 70, 72 and 74 beneath the margins of the film or negative. Thus when oriented all air is evacuated from beneath the film and it is tightly drawn into intimate conformity with the platen surface 36.

A feature of the invention is that platen surface 36 is the image area of the light exiting surface 34 of the first condenser 26 itself. Therefore, the platen surface 36 can be finished with the grinding of the condenser lens to an exceedingly fine finish. The large size and particularly thickness of the condenser lens facilitates the mounting in the polishing machine. Furthermore, as the oriented film or negative conforms to the platen surface 36 which comprises the plane of the front or light exiting surface 34 of the condenser lens system, the film or negative image is fully and uniformly lighted out to the edges thereof.

As shown in FIG. 2, the side edges of jig 30 about aperture 32 may be recessed as indicated at 108 and the walls thereof inclined to provide room for an operator to insert his fingernail beneath the film edge and so facilitate removing the film against the pull of the evacuating air pump. If desired or necessary, in order to assure an adequate seal of the air evacuating channels in the underside of the jig 30, a continuous meniscus of mastic material may be provided about the edges of the aperture 32 as indicated at 110 in FIG. 2 and also about the outer periphery of the lens where it meets the rear side of the jig as illustrated at 112 in FIGS. 2 and 8.

Figure 9:
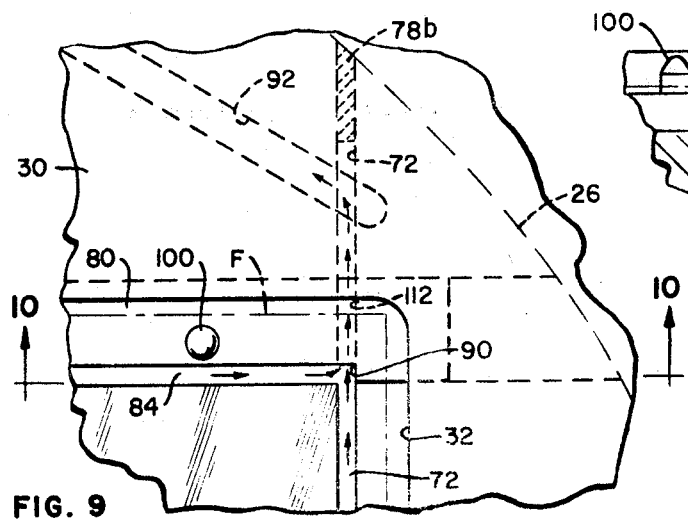
FIG. 9 illustrates an alternate arrangement for porting said channel through the condenser lens supporting structure to the evacuation pump.
Figure 10:
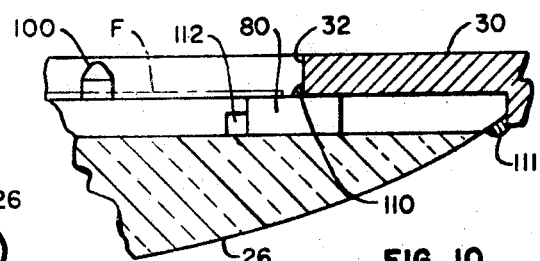
FIG. 10 comprises a sectional view taken along lines 10—10 in FIG. 9.

An alternate arrangement for porting the air evacuating channel to the air evacuating pump via channels 92 in the jig plate is illustrated by FIGS. 9 and 10. Referring now to said FIGS. 9 and 10, it will be seen that the cutouts 86 at the two opposed ends of the registration pin bearing plate 80 have been omitted and in their place vertically disposed grooves 112 have been milled across the underside of the plate so as to align and establish communication with the portions of the two horizontal grooves 70 and 72 on either side of the grooves 76 which receives the plate 80. In this alternate embodiment, channels 92 need only extend far enough to cross those portions of grooves 70 and 72 on the upper or lens edge side of the pin registration plate 80 to establish communication with the air evacuating channel represented by cutout 84 and the communicating portions of grooves 70, 72 and 74. Lateral grooves 112 in the pin registration bearing plate 80 can be omitted altogether if the vertical slots 70 and 72 initially are milled to a depth greater than the depth to which grooves 76 is milled.

From the above description of the preferred embodiments of the invention, it will be appreciated that all of the recited objects, advantages and features of the invention have been demonstrated as obtainable in a highly practical and satisfactory manner.

Having described my invention, I claim:

1. In a projector, the combination of a plano-convex condenser lens and a holder therefor having a frame portion which overlies the margin of the plane side of the lens, the central area of said plane side containing a plurality of angularly related intersecting grooves having inner, outer and bottom walls, and a plate fixed in one of said grooves bearing film registration pins which project from the outer surface thereof, said outer surface of the plate being substantially flush with the lens surface and having an inner wall spaced from the inner wall of the one groove in which said plate is fixed to form a space, said space extending lengthwise of the plate and communicating with the other grooves which intersect said one of said grooves, said space and grooves together constituting a channel which defines therewithin a flat film mounting area on said plane side, one of said grooves having a portion thereof extending beneath the frame portion of the lens holder, said frame portion having a passageway on its side next to said lens which communicates with said portion of the groove extending beneath the frame portion, the lens holder having means for connecting said passageway to air evacuating means.

2. The combination according to claim 1 wherein the grooves terminate short of the peripheral edge of the lens.

3. The combination according to claim 1 wherein the passageway of the frame portion overlies one end of the grooves in which the film registration pins bearing plate is fixed, the said plate having a recess on its underside which ports said continuous channel to the portion of the grooves with which the passageway of the frame portion has communication.

4. In combination, a condenser less having a continuous channel in its light exiting surface, a separately constituted plate fixed in said surface along a portion of said channel with its outer surface substantially flush with the light exiting surface of the condenser lens, said plate having film registration means for locating a film on said surface with its margins lapping said channel, and port means in said plate through which said channel communicates for connection to air evacuating means.

5. The combination according to claim 4 wherein the plate has an inner wall which defines one side of said portion of the channel.

6. In combination, a condenser lens having a light exiting surface and four intersecting grooves in said surface thereof, said grooves each having an inner, outer and bottom wall, and a plate fixed in one of said grooves, said plate having an inner wall spaced from the inner wall of said one of said grooves to form a space therebetween, said space extending lengthwise of the plate and communicating with the grooves which intersect said one of the grooves, said space and grooves together constituting a continuous channel which defines therewith a film mounting area on said light exiting surface of the condenser lens, said plate having film registration means thereon, and port means communicating with said continuous channel for establishing communication with air evacuating means which connect to a holder in which the condenser lens is mounted.

7. The combination of claim 6 wherein the outer surface of the plate is substantially flush with the surface of the condenser lens.

8. The combination of claim 7 wherein the inner wall of the film registration plate forms a recess along one side thereof to provide said space.

9. The combination of claim 8 wherein the plate has end portions beyond the intersecting grooves which completely fill and close off said one of the grooves.

10. The combination of claim 6 wherein the one of said grooves is wider than the other three grooves which are of equal width, the space in said one of said grooves between the plate and its inner wall having a width approximately the width of the other three grooves.

11. The combination of claim 6 wherein the ends of the grooves are closed short of the lens peripheral edge and the plate has port means through which said space communicates with a provided passageway in the frame portion of a holder which is assembled with the lens in overlying relation with the margin of the lens outside said space and communicating grooves.

12. In combination, a condenser lens having intersecting grooves in a light exiting surface thereof which form a continuous channel about a film mounting area of said lens surface, said grooves each having inner, outer and bottom walls, and a film registration plate fixed in one of said grooves for locating a film on said mounting area with its margins lapping said channel, said film registration plate providing a space which extends lengthwise thereof in said one of said grooves and communicates with the grooves intersecting said one of said grooves, the said film registration plate having portions closing the one of said grooves beyond the grooves intersecting it, and a supporting frame for said condenser lens in overlying contact with said light exiting surface of the lens outside said continuous channel, said frame having a passageway in its lens surface contacting side, the film registering plate having a cutout which opens at one end into said space and communicates with said passageway in the frame at a second end, said frame having means communicating with said passageway for connection to an air evacuator.

13. The combination of claim 12 wherein said plate has end portions which completely fill and close off the one of said grooves between the inner edge of the frame and the intersection of said one of said grooves with the other of said grooves, one of said end portions having a cut out in its under side through which the passageway of the frame has communication with said space.

* * * * *